UNITED STATES PATENT OFFICE.

JOHN F. NEWELL, OF GARDINER, MAINE.

COMPOSITION FOR BEARINGS.

SPECIFICATION forming part of Letters Patent No. 494,433, dated March 28, 1893.

Application filed November 10, 1892. Serial No. 451,559. (Specimens.)

*To all whom it may concern:*

Be it known that I, JOHN F. NEWELL, a citizen of the United States of America, and a resident of the town of Gardiner, in the county of Kennebec and State of Maine, have invented certain new and useful Improvements in a Composition for Bearings of Journals, Spindles, Shafts, &c., of which the following is a full, clear, and exact description.

This invention relates to an improvement in the composition of materials, produced from comminuted plumbago or graphite, and sundry fibers, minerals and oils suitable for all frictional bearings and for bearings for journals, spindles, shafts, &c., and which not only shall be anti-frictional and a lubricant to the highest degree, but also shall be substantially homogeneous, most solid, compact, hard and durable throughout.

To the end stated, this invention consists in a composition of matter for bearings, &c., composed of plumbago, fibrous substance, an oil, and an oxide, carbonate, or basic carbonate of lead, or equivalent thereof, which will unite chemically with the oil to bind or cement the fibrous substance and plumbago together.

The composition is preferably compounded as follows: plumbago comminuted, three parts; fibrous substance, three parts; an oxide, carbonate or basic carbonate of lead, three parts; and an oil, preferably linseed oil, in sufficient quantity, as hereinafter appears. The combined plumbago and fibrous substance, (a jute fiber being preferable) should, for the best results, each be finely divided, and the plumbago, in a pure condition, and they are, with the aid of water, thoroughly mixed and incorporated with each other and thus the particles of plumbago are intimately associated with and held by the fibers. The oxide, carbonate or basic carbonate of lead is mixed with the linseed oil, which is in sufficient quantity to bring the oxide, carbonate or basic carbonate of lead into a more or less liquid condition, and then this mixture and the mixture of the plumbago and fibrous substance are throughly mixed with each other, and the whole being molded, under sufficient pressure to shape and to express the water, is then dried until in a more or less tacky condition, when it is again molded under a second and much heavier pressure and thereby rendered throughout compact and hard, when finally, it is dried under heat, the result being a most solid, compact and practically homogeneous molded form of plumbago permeated throughout with fiber and the lead and oil. The fibrous substance and the plumbago being intimately connected are thereby entangled, while the lead and oil become chemically united and cement or bind the fibers and particles of plumbago together to make the whole mass substantially homogeneous, hard, solid and compact throughout, the result being a bearing for frictional surfaces, such as journals, spindles, shafts, &c., and other articles which, in the highest degree, is most useful and practical, strong and durable, and further, one anti-frictional and lubricant.

In the preparation of the composition, the whole of the constituents are suspended in the water and beaten or agitated and in this way the individual particles of solid substance become coated with oil, which they take up from the watery emulsion and without becoming so compacted together as to prevent the uniform penetration of the oil. When the water is expressed from the mass the oil-coated solid particles are brought together and the whole is condensed into a hard, homogeneous mass, which is a condition very important for the uniform formation of the cementing material throughout the mass during the heating operation.

It is not intended to limit this invention to any particular proportions of the materials named, and it is preferable in incorporating the oil with the other ingredients to employ the method described in my application, Serial No. 451,560.

It has heretofore been proposed to provide a composition for journal bearings, consisting of graphite, fiber, white lead, and glue or shellac, the glue being dissolved in water or in linseed oil; but such does not constitute my invention.

Having thus described my invention, what I claim, and desire to secure by Letters Patent, is—

A composition of matter for bearings, &c., composed of plumbago, fibrous substance, an oil, and an oxide, carbonate, or basic carbonate of lead, substantially as described.

In testimony whereof I have hereunto set my hand in the presence of two subscribing witnesses.

JOHN F. NEWELL.

Witnesses:
O. B. CLASON,
GEO. E. SPARE.